US012625826B2

(12) United States Patent
Tanpairoj et al.

(10) Patent No.: US 12,625,826 B2
(45) Date of Patent: *May 12, 2026

(54) PERFORMANCE OF MEMORY SYSTEM BACKGROUND OPERATIONS

(71) Applicant: Micron Technology, Inc., Boise, ID (US)

(72) Inventors: Kulachet Tanpairoj, Santa Clara, CA (US); Christian M. Gyllenskog, Meridian, ID (US); David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,220

(22) Filed: Jan. 29, 2024

(65) Prior Publication Data

US 2024/0168895 A1 May 23, 2024

Related U.S. Application Data

(63) Continuation of application No. 17/111,195, filed on Dec. 3, 2020, now Pat. No. 11,892,956.

(Continued)

(51) Int. Cl.
*G06F 13/16* (2006.01)
*G06F 11/30* (2006.01)
(Continued)

(52) U.S. Cl.
CPC ...... *G06F 13/1668* (2013.01); *G06F 11/3037* (2013.01); *G06F 11/3058* (2013.01);
(Continued)

(58) Field of Classification Search
CPC .. G06F 13/1668; G06F 3/0679; G06F 3/0659; G06F 3/0604
(Continued)

(56) References Cited

U.S. PATENT DOCUMENTS 5,592,069 A 1/1997 Dias et al.
5,822,246 A 10/1998 Taub et al.
(Continued)

FOREIGN PATENT DOCUMENTS

CN 115398384 A 11/2022
KR 20190040604 A 4/2019
(Continued)

OTHER PUBLICATIONS

"European Application Serial No. 20910738.2, Response filed Jul. 8, 2024 to Extended European Search Report mailed Dec. 12, 2023", 146 pages.
(Continued)

*Primary Examiner* — Titus Wong
(74) *Attorney, Agent, or Firm* — Schwegman Lundberg & Woessner, P.A.

(57) ABSTRACT

Various examples are directed to devices and methods involving a host device and a memory system, the memory system comprising a memory controller and a plurality of memory locations. The memory system may send to the host device a first message describing background operations to be performed at the memory system. The memory system may receive from the host device a second message indicating permission to execute the background operations and may begin to execute at least one background operation.

20 Claims, 11 Drawing Sheets

Related U.S. Application Data

(60) Provisional application No. 62/955,719, filed on Dec. 31, 2019.

(51) Int. Cl.
| | |
|---|---|
| *G06F 12/02* | (2006.01) |
| *G06F 12/0868* | (2016.01) |
| *G06F 13/24* | (2006.01) |

(52) U.S. Cl.
CPC ...... *G06F 12/0238* (2013.01); *G06F 12/0868* (2013.01); *G06F 13/24* (2013.01)

(58) Field of Classification Search
USPC ........................................................ 711/154
See application file for complete search history.

(56) References Cited

U.S. PATENT DOCUMENTS

| | | | |
|---|---|---|---|
| 6,037,815 A | 3/2000 | Togami | |
| 6,107,802 A | 8/2000 | Landau et al. | |
| 6,133,781 A | 10/2000 | Fujii et al. | |
| 6,369,576 B1 | 4/2002 | Matthews et al. | |
| 6,549,991 B1* | 4/2003 | Huang ................ | G06F 13/1626 |
| | | | 711/158 |
| 6,775,729 B1 | 8/2004 | Matsuo et al. | |
| 7,064,994 B1* | 6/2006 | Wu .......................... | G06F 1/206 |
| | | | 702/132 |
| 7,730,295 B1 | 6/2010 | Lee | |
| 8,140,738 B2 | 3/2012 | Minz et al. | |
| 8,250,271 B2 | 8/2012 | Swing et al. | |
| 8,447,544 B2 | 5/2013 | Hsu et al. | |
| 9,164,833 B2 | 10/2015 | Um et al. | |
| 9,229,854 B1* | 1/2016 | Kuzmin ................ | G06F 3/0679 |
| 9,424,901 B1 | 8/2016 | An et al. | |
| 9,459,687 B2 | 10/2016 | Park et al. | |
| 9,578,034 B2 | 2/2017 | Potlapally et al. | |
| 9,760,481 B2 | 9/2017 | D'abreu | |
| 11,663,148 B2 | 5/2023 | Tanpairoj et al. | |
| 2002/0124125 A1 | 9/2002 | Bormann et al. | |
| 2006/0176013 A1 | 8/2006 | Watts | |
| 2007/0050669 A1* | 3/2007 | Ofer ...................... | G06F 9/4881 |
| | | | 714/6.12 |
| 2007/0198996 A1 | 8/2007 | Chiu et al. | |
| 2008/0179957 A1 | 7/2008 | Tsui et al. | |
| 2008/0315833 A1 | 12/2008 | Li et al. | |

| | | | |
|---|---|---|---|
| 2009/0128091 A1 | 5/2009 | Purdy et al. | |
| 2009/0292865 A1 | 11/2009 | Hong | |
| 2010/0030961 A9 | 2/2010 | Ma et al. | |
| 2010/0046290 A1 | 2/2010 | Park et al. | |
| 2010/0058018 A1 | 3/2010 | Kund et al. | |
| 2010/0115336 A1 | 5/2010 | Shin et al. | |
| 2010/0205362 A1 | 8/2010 | Lasser | |
| 2010/0217927 A1 | 8/2010 | Song et al. | |
| 2011/0035574 A1 | 2/2011 | Jevans et al. | |
| 2011/0246756 A1 | 10/2011 | Smith et al. | |
| 2011/0302352 A1 | 12/2011 | Lee et al. | |
| 2012/0066438 A1 | 3/2012 | Yoon et al. | |
| 2012/0191933 A1 | 7/2012 | Zbiciak et al. | |
| 2012/0260118 A1* | 10/2012 | Jiang ...................... | G06F 9/4893 |
| | | | 713/340 |
| 2013/0145106 A1 | 6/2013 | Kan | |
| 2014/0189198 A1* | 7/2014 | Siddiqi ............... | G06F 12/0246 |
| | | | 711/103 |
| 2014/0215129 A1* | 7/2014 | Kuzmin .............. | G06F 12/0246 |
| | | | 711/103 |
| 2014/0325131 A1* | 10/2014 | Lassa ................... | G06F 12/0246 |
| | | | 711/103 |
| 2015/0131375 A1 | 5/2015 | Kwak et al. | |
| 2015/0363342 A1 | 12/2015 | Tuers et al. | |
| 2016/0034308 A1* | 2/2016 | Kishan .................. | G06F 9/5011 |
| | | | 718/104 |
| 2016/0117119 A1 | 4/2016 | Kim | |
| 2016/0225459 A1 | 8/2016 | Boysan et al. | |
| 2017/0109097 A1 | 4/2017 | Lai et al. | |
| 2017/0133093 A1 | 5/2017 | Lim et al. | |
| 2018/0129416 A1* | 5/2018 | Kim ...................... | G06F 3/0679 |
| 2018/0336146 A1 | 11/2018 | Blodgett et al. | |
| 2021/0200698 A1 | 7/2021 | Tanpairoj et al. | |
| 2021/0200700 A1 | 7/2021 | Tanpairoj et al. | |

FOREIGN PATENT DOCUMENTS

| | | |
|---|---|---|
| TW | 201610627 A | 3/2016 |
| TW | 202132985 A | 9/2021 |
| WO | WO-2021138424 A1 | 7/2021 |
| WO | WO-2021138424 A8 | 7/2021 |

OTHER PUBLICATIONS

"European Application Serial No. 20910738.2, Communication Pursuant to Article 94(3) EPC mailed Jul. 23, 2025", 11 pages.

* cited by examiner

302 — RECEIVE PULSE SIGNAL
FROM RESET PIN

304 — SIGNAL
= PATTERN?

NO

YES

306 — INITIATE BACKGROUND
OPERATION

300

700

702 — RECEIVE HOST QUERY FOR A DEVICE DESCRIPTOR, ATTRIBUTE, AND/OR FLAG

704 — SEARCH FOR THE REQUESTED DEVICE DESCRIPTOR

706 — LOCATED?

NO

SEND QUERY RESPONSE WITH ERROR INDICATOR — 712

YES

710 — SEND QUERY RESPONSE WITH REQUESTED DEVICE DESCRIPTOR, ATTRIBUTE AND/OR FLAG

1000

1040

1030

1050

1001

1010

1020

HOST

MEMORY SYSTEM

PERFORMANCE OF MEMORY SYSTEM BACKGROUND OPERATIONS

PRIORITY

This application is a continuation of U.S. application Ser. No. 17/111,195, filed Dec. 3, 2020, which claims the benefit of U.S. Provisional Patent Application Ser. No. 62/955,719 filed on Dec. 31, 2019, all of which are incorporated herein by reference in their entirety.

BACKGROUND

Memory devices are typically provided as internal semiconductor circuits in that provide electronic storage of data for a computer or other electronic device. Memory devices may be volatile or non-volatile. Volatile memory requires power to maintain data and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), and three-dimensional (3D)-Xpoint memory, among others.

Computers and other electronic devices typically include a host device and one or more memory systems. The host device includes a processor and a first amount of main memory (e.g., often volatile memory, such as DRAM) to support the host processor. The one or more memory systems (e.g., often non-volatile memory, such as flash memory) are in communication with the host device to provide additional storage, such as to retain data in addition to or separate from the main memory.

A memory system (e.g., a solid-state drive (SSD), a managed memory device (for example, a managed NAND memory device)), can include a memory controller and one or more memory devices, including a number of (e.g., multiple) dies or logical units (LUNs). In certain examples, each die can include a number of memory arrays and peripheral circuitry thereon, such as die logic or a die processor. The memory controller can include interface circuitry configured to communicate with a host device (e.g., the host processor or interface circuitry) through a communication interface (e.g., a bidirectional parallel or serial communication interface). The memory controller can receive commands or operations from the host device in association with memory operations or instructions, such as read or write operations to transfer data (e.g., user data and associated integrity data, such as error data or address data, etc.) between the memory devices and the host device and erase operations to erase data from the memory devices. The memory controller can also perform memory management operations (e.g., data migration, garbage collection, block retirement).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION

Figure 1:
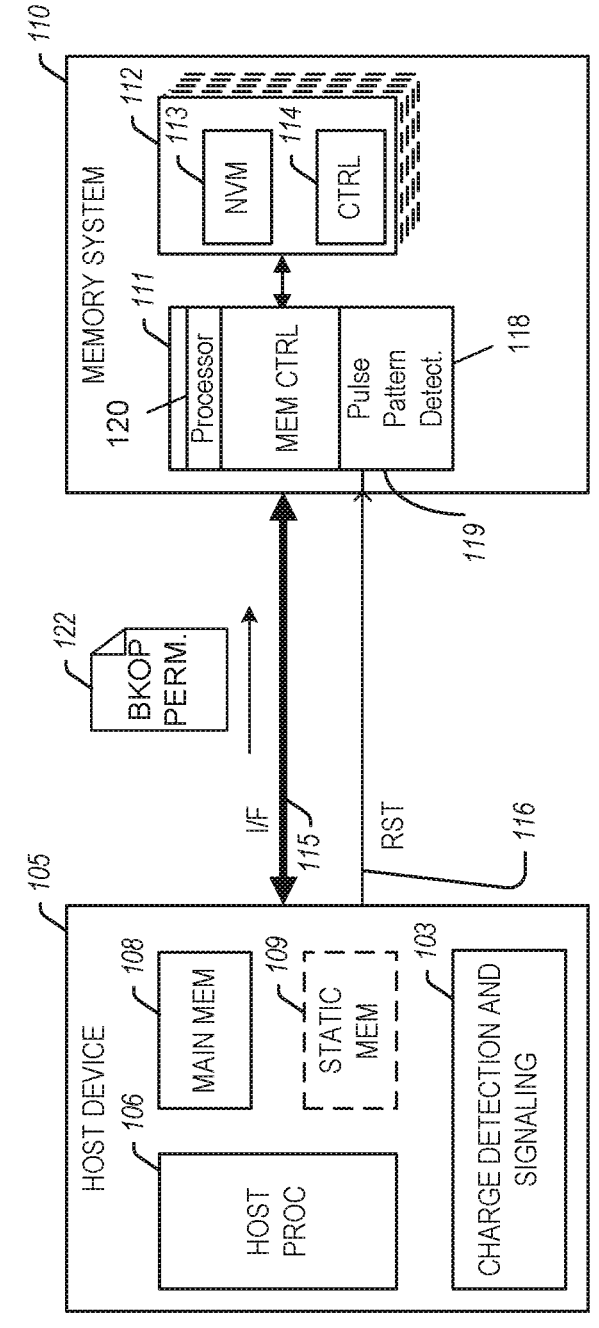
FIG. 1 shows an example electronic device including a host device and a memory system.

With a seemingly ever increasing use of host devices and memory devices in electronic devices, which often spend much of their operating time on battery power, performing memory system background operations at times of battery power can provide a drain on the battery. Embodiments of the present disclosure relate generally to mobile device background operations and more specifically relate to methods for determining when memory device background operations should be performed.

An electronic device including a host device and one or more memory systems may be subject to performance, reliability, and power consumption requirements and these requirements often conflict with each other. In general, users will expect the electronic device to provide quick access to data and applications, while not draining battery power at an excessive rate such that electronic device charging is required more than once per day. At the same time, users will expect memory system reliability derived from the performance of certain memory system background operations. These background operations may be performed, to the extent possible, when other memory functions are limited or suspended. Nonetheless, if the background operations are performed while the electronic device is active, the effects on performance and battery life, as well as slowing of the electronic device performance and other issues, can be noticeable by the user.

The present inventors have recognized, among other things, that at least some memory system background operations may be advantageously performed when an electronic device is not being used and while the electronic device is not relying on battery power (for example, when the electronic device user is charging the mobile device overnight). Because electronic devices can take hours to become fully charged, most users will charge their electronic devices at night while sleeping or during another extended period when users anticipate they will not be using their mobile devices (e.g., the mobile devices may be in idle mode, power save mode, or other low-power mode). Methods and systems according to embodiments, therefore, perform at least some portion of the above and other memory system background operations while the electronic device is being charged, so that impact on performance and battery life will not be noticed by the user.

Various example techniques described herein permit the memory system to determine when it is acceptable to perform background operations (e.g., by determining when the electronic device is charging or otherwise in an idle or low-power mode). In some examples, a host device provides the memory system with a command or instruction indicating to the memory device that it is permissible to execute background operations. For example, the host device may provide the command or instruction when the electronic device is charging its battery or otherwise in an idle or low-power mode.

In some examples, the host device provides the memory system with a pulse pattern, where the pulse pattern indicates that it is acceptable for the memory system to perform background operations (e.g., because the electronic device is being charged). The pulse pattern may be provided by the host device at an existing pin connection between the host device and the memory system such as, for example, at a reset pin.

In some example embodiments, the memory system and host device are arranged to exchange information and commands regarding the timing of background operations. The memory system is configured to provide background operation data to the host device, where the background operation data indicates a volume of background operations to be executed. The host device provides the memory system with a message indicating that the memory system is permitted to execute background operations. In some examples, the host device also provides a time period for executing the background operations. In this way, the host device may manage operations performed while the electronic device is charging its battery including, for example, operations performed by parts of the system other than the memory system. Also, in some examples, the host device provides a background operation interrupt signal to the memory system. Upon receiving the background operation interrupt signal, the memory system stops execution of background operations.

FIG. 1 shows an example electronic device 100 including a host device 105 and a memory system 110 configured to communicate over a communication interface (I/F) 115 (e.g., a bidirectional parallel or serial communication interface). In an example, the communication interface 115 can be referred to as a host interface; and for purposes of the present example will be discussed as being a UFS-compliant communication interface 115.

The host device 105 can include a host processor 106 (e.g., a host central processing unit (CPU) or other processor or processing device) or other host circuitry (e.g., a memory management unit (MMU), interface circuitry, etc.). In certain examples, the host device 105 can include a main memory (MAIN MEM) 108 (e.g., DRAM, etc.) and, optionally, a static memory (STATIC MEM) 109, to support operation of the host processor (HOST PROC) 106. Additionally, as an example, for illustrating the current system, the host device 105 may include a charge detection and signaling circuit 103, which will be configured to detect a charging condition and to generate a first signal communicated to one or more selected pins of communication interface 115. For example, externally-supplied charging power to the host, or to the host battery, may be detected by identifying a positive signal at an identified node in or coupled to the charging path. A signal reflective of that positive signal (i.e., a sensor signal) may then be used to generate the first signal, having a preselected configuration, as discussed in more detail below. In some examples, the generation of the first signal in response to the sensor signal may be performed by execution by the host processor of instructions stored within the host device. In other examples, the generation of the first signal in response to the sensor signal may be performed at least in part through dedicated processing circuitry (which may include, in some examples, one or more processors).

The memory system 110 may include one or more memory die, and any controller functionality for such memory die, when present. For example, the memory system may be or include individual memory devices, managed memory devices, SSDs, and so on. A memory device may include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with the host device 105, as discussed herein. In managed memory devices, the controller functionality may be implemented on one or more die and associated with one or more memory die (for example by being packaged together in some implementations). In other examples, one or more memory devices may be combined with controller functionality to form an SSD storage volume.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells, to obviate internal battery supply requirements, thus allowing the drive to be more versatile and compact. Managed NAND devices can be used as primary or ancillary memory in various forms of electronic devices and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

The memory system 110 can include one or more memory devices 112 including, for example, a UFS device, an embedded MMC (eMMC™) device, or one or more other memory devices. For example, UFS devices may be configured in accordance with Joint Electron Device Engineering Council (JEDEC) standards standard JESD223D, entitled "JEDEC UFS Flash Storage 3.0," and/or updates or subsequent versions to such standard. For example, if the memory system 110 includes a UFS device, the communication interface 115 can include a serial bidirectional interface, such as defined in one JEDEC standard D223D. Similarly, identified eMMC devices may be configured in accordance with JEDEC standard JESD84-A51 and/or updates or subsequent versions to such standard. For example, if the memory system 110 includes an eMMC device, the communication interface 115 can include a number of parallel bidirectional data lines (e.g., DAT[7:0]) and one or more command lines, such as defined in one or more JEDEC standards such as JEDEC standard D84-B51. In other examples, the memory system 110 can include one or more other memory devices, or the communication interface 115 can include one or more other interfaces, depending on the host device 105 and the memory system 110.

Flash memory devices, such as UFC devices and eMMC devices, typically include one or more groups of one-transistor, floating gate (FG) or charge trap (CT) memory cells. Two common types of flash memory array architectures include NAND and NOR architectures. The memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology. NAND flash architecture semiconductor memory arrays are accessed through decoders that activate specific memory cells by selecting the word line coupled to their gates. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

The memory system 110 can include a memory controller (MEM CTRL) 111 and a non-volatile memory device 112. In an example, the non-volatile memory device 112 can include a number of non-volatile memory devices (e.g., dies or LUNs), such as one or more stacked flash memory devices (e.g., as illustrated with the stacked dashes underneath the non-volatile memory device 112), with each including non-volatile memory (NVM) 113 (e.g., one or more groups of non-volatile memory cells) and a device controller (CTRL) 114 or other periphery circuitry thereon (e.g., device logic, etc.), and controlled by the memory controller 111 over an internal storage-system communication interface (e.g., an Open NAND Flash Interface (ONFI) bus, etc.) separate from the communication interface 115.

The non-volatile memory device 112 or the non-volatile memory 113 (e.g., one or more 3D NAND architecture semiconductor memory arrays) can include a number of memory cells arranged in, for example, a number of devices, planes, blocks, physical pages, super blocks, or super pages. As one example, a triple layer cell (TLC) memory device can include 18,592 bytes (B) of data per page, 1536 pages per block, 548 blocks per plane, and 4 planes per device. In operation, in the example of NAND-based storage, data is typically written to or read from the memory system 110 in "pages" and erased in "blocks." However, one or more memory operations (e.g., read, write, erase, etc.) can be performed on larger or smaller groups of memory cells, as desired.

As noted above, memory systems, such as the memory system 110, perform memory system background operations beyond just reading and writing data for a host. Such background operations include, for example, Garbage Collection (GC), single-level cell (SLC) cache management, cell refresh operations, and updating a tracking database of logical addresses at the memory system. It will be appreciated, however, that memory systems may perform other background operations in addition to or instead of those examples described herein.

Garbage collection (GC) is an operation to manage memory utilization in a flash memory. When the free physical space in a flash memory gets low, GC can recover free space on the storage device to allow for new host data to be written. During GC, a flash block that contains pages with valid data and pages with stale data (garbage) is read. Pages with the valid data are preserved, by writing to another fresh block. The logical block address is then updated with the new location. Pages with stale data marked for deletion remain on the location in the old block. Then, the entire old block (that contains pages with the stale data) is erased. Additional memory management operations commonly performed in the background may involve block retirement, error detection and correction, etc.

SLC cache management includes maintaining and/or updating an SLC cache. For example, flash memory cells in a NOR or NAND architecture semiconductor memory array can be programmed individually or collectively to one or a number of programmed states. An SLC can represent one of two programmed states (e.g., 1 or 0), representing one bit of data. Other cells, however, can be programmed to represent one of more than two programmed states. This allows the manufacture of higher density memories without increasing the number of memory cells, as each cell can represent more than one binary digit (e.g., more than one bit). Cells programmable to represent one of more than two programmed states can be referred to as multi-state memory cells, multi-digit cells, or multi-level cells (MLCs). In certain legacy examples, MLC has been used to refer to a memory cell that can store two bits of data per cell (e.g., one of four programmed states), while a TLC can refer to a memory cell that can store three bits of data per cell (e.g., one of eight programmed states), and a quad-level cell (QLC) can refer to cells capable of storing four bits of data per cell. MLC is used herein in its broader context, to can refer to any memory cell that can store more than one bit of data per cell (i.e., that can represent more than two programmed states).

In practice, an MLC may take longer to program than an SLC. In some examples, this is because charge placement on the MLC may need to be more precise than on an SLC so as to distinguish between different programmed states. Accordingly, some memory systems including MLCs also utilize an SLC cache. According to an SLC cache, some cells may be configured as SLC, while other cells are configured as MLC. When a write request is received, the memory system 110 may initially write the stored data to the SLC cache. SLC cache management includes copying data originally written to the SLC cache to more compact storage (e.g., SLC cache to MLC storage). The amount of time to copy the SLC cache will depend on how much memory data is copied and on the MLC level to which the cache is being copied, among other factors.

Memory system background operations can also include cell refresh operations. Flash devices work by trapping a charge in a cell (e.g., in a charge trap or floating gate) that then interferes with opening a channel by a control gate. The control gate read voltage is calibrated to be between two or more trapped charge states. Thus, if the channel opens (e.g., the control gate voltage can override the trapped charge) the cell has one value (e.g., a '1' in a SLC) and a different value if the channel does not open (e.g., a '0' in an SLC). Thus, it is important that the trapped charge is calibrated with the read voltage. If the calibration is incorrect, the value of the cell can be misread, prompting error recovery techniques that can increase latency in NAND operations. The calibration of the trapped charge and read voltage can be affected by several circumstances. For example, the trapped charge can dissipate over time. This condition can be detected and remedied via a cell refresh.

Memory system background operations can also include updating or maintaining a logical-to-physical tracking database. For example, the memory system 110 also tracks physical memory locations of logical addresses (e.g., using a tracking database). The tracking database relates physical memory locations at the memory device 112 to logical addresses, for example, referenced by the host device. Background operations can also include updating and/or maintaining this tracking database.

As described herein, at least some portion of the background operations for the memory system 110 may be deferred until a time when the electronic device is not dependent on battery power. In some implementations this can be achieved without modifying an industry standard physical interface, such as a UFS or eMMC-compliant physical interface. For example, a memory device 112 of the memory system 110 (e.g., a UFS device) can further include a unidirectional reset interface (RST) 116, such as a hardware reset signal interface from the host device 105 to the memory system 110. The memory controller 111 can receive instructions from the host device 105, and can communicate with the non-volatile memory device 112, such as to transfer data to (e.g., write or erase) or from (e.g., read) one or more of the memory cells of the non-volatile memory device 112. The memory controller 111 can include, among other things, circuitry or firmware, such as a number of components or integrated circuits. The memory controller 111 can include a processor 120 responsive to instructions retained in the memory system 110 which, when executed by the processor 120, cause the processor 120 to perform operations correlated to the instructions. The operations can include operations of a pulse pattern detector 118 described below.

Figure 2:
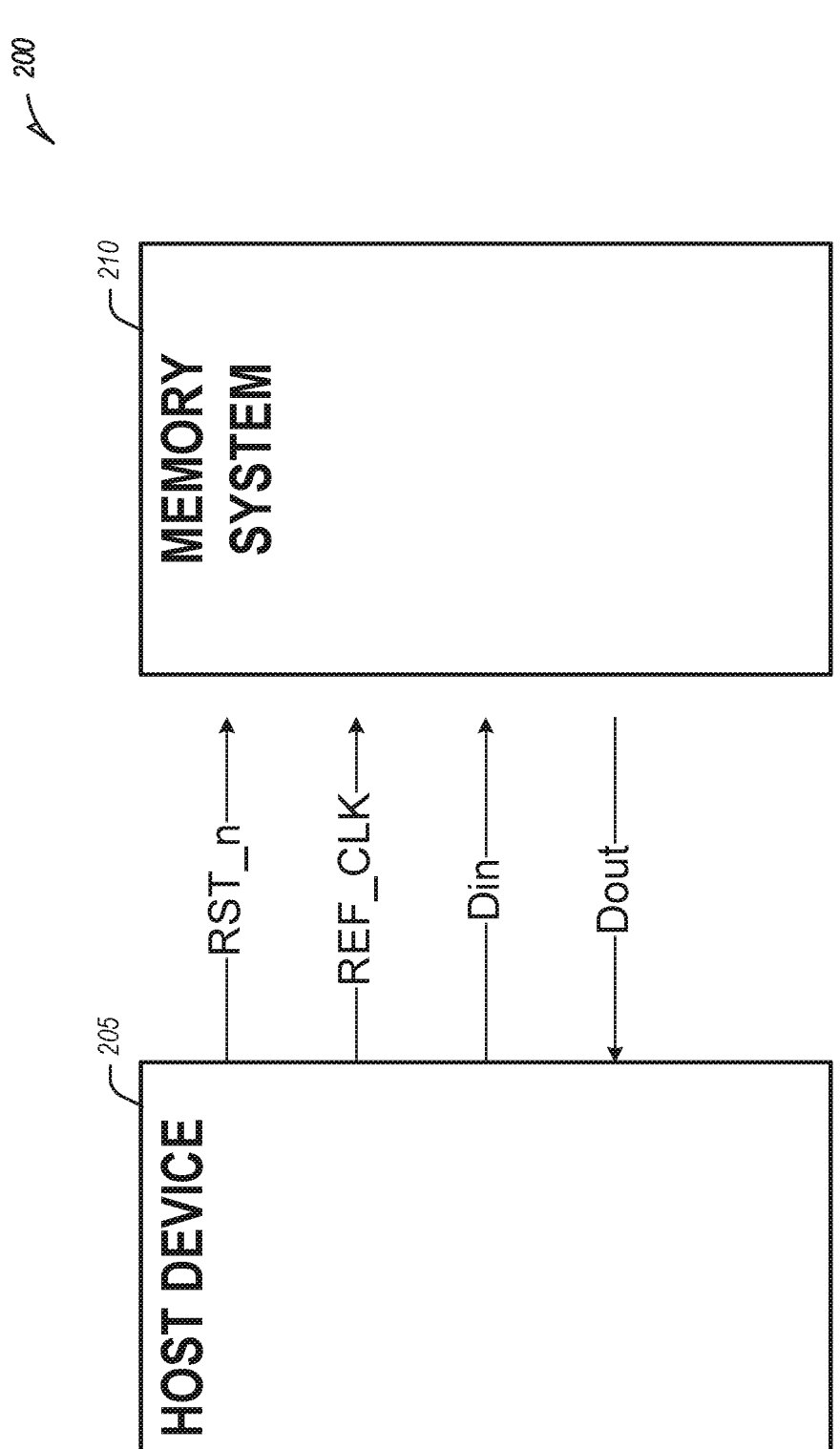
FIG. 2 shows an example electronic device including a host and a memory system and showing signals between the host and the memory system.

FIG. 2 shows an example electronic device 200 including a host 205 and a memory system 210 and showing signals between the host 205 and the memory system 210. The host 205 and memory system 210 can be implemented similarly to a host device 105 and memory system 110, respectively, of FIG. 1. The signals shown are a reset signal, RST (which can be similar to RST 116 (FIG. 1)), a reference clock, REF_CLK, a data-in signal, DIN_t/c, and a data-out signal, DOUT_t/c, though other signals are conveyed between the host 205 and the memory system 210 in operation of a system comprising such apparatus. The RST signal can be an active low signal, designated RST_n, with activation on a negative. RST_n can be defined as active based on UFS standards. For example, in the UFS specification, RST_n is defined as active by keeping the reset signal pulled down greater than 1 µS and then holding the reset signal pulled high for a length greater than 1 µS. A pulse width for a reset signal can also be defined by specification. The $D_{IN}$ and $D_{OUT}$ signals can be true/complement signals meaning that they are differential signals. Due to a user board layout limitation, it may be difficult to define a new hardware pin dedicated for the battery charging notification. Therefore, in some embodiments, an existing pin of the memory system 210 (e.g., the reset pin 119 (FIG. 1)) can be shared by a battery charging notification and a function (e.g., a reset function) assigned to the existing pin.

Referring again to FIG. 1, the memory controller 111 can include a pulse pattern detector 118 coupled to a pin (e.g., the reset pin 119). Some operations of the pulse pattern detector 118 can be implemented in software, hardware, firmware, or a combination thereof. While embodiments are described herein with respect to signals at reset pin 119, embodiments are not limited thereto, and the signal can occur at other pins already part of the memory system 110 or at a new pin added to the memory system 110 for implementation of operations described herein.

The pulse pattern detector 118 can include filtering circuitry and timing circuitry to aid in detection of parameters of a pulse (e.g., timing parameters, pulse width, rising and falling edges, etc.). These and other parameters can help the pulse pattern detector 118 distinguish the received pulse signal from, for example, a standard reset signal, which can have timing parameters set by UFS specifications. For example, a reset signal according to UFS specifications may have a defined pulse width. The pulse pattern detector 118 can determine whether a pulse signal received by a designated pin or pins, in the present example the UFS-specified reset pin 119, conforms to a predetermined pulse pattern (e.g., a first pulse pattern).

The predetermined pulse pattern can contain, for example, eight (8) pulses, although embodiments are not limited thereto. Herein, a pulse has an amplitude greater than a preset value, so as to be distinguishable from noise at the reset pin 119. If the pulse signal conforms to a predetermined pulse pattern, this can indicate that the electronic device 100 is in a battery charging state and that background operations can be performed. Other pulse patterns can be used to signify different states; for example, a second pulse pattern can indicate a timeout error (e.g., indication that the electronic device 100 is in an unknown or "stuck" state).

Figure 3:
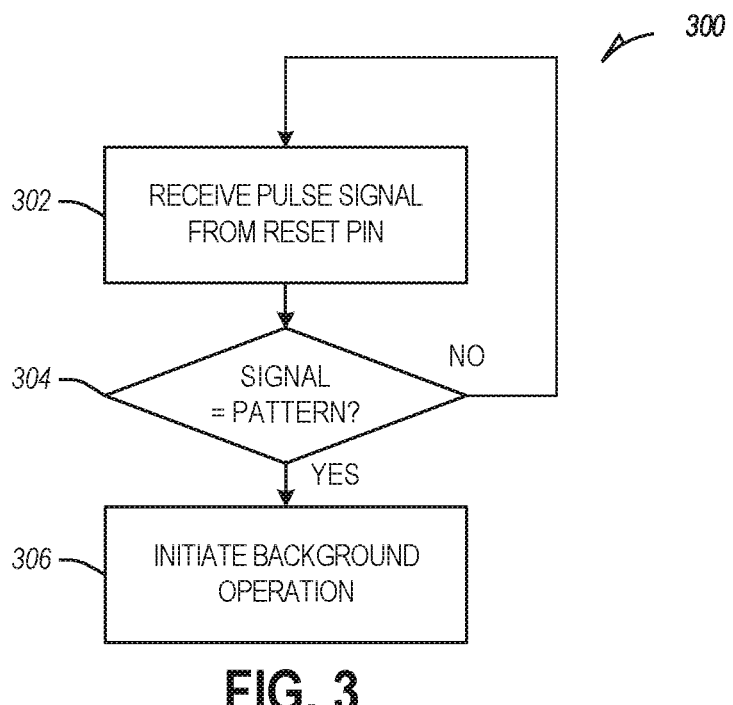
FIG. 3 is a flowchart showing one example of a process flow for performing memory system background operations.

FIG. 3 is a flowchart showing one example of a process flow 300 for performing memory system 110 background operations. Systems, apparatuses and methods according to these and other embodiments can reduce negative effects on electronic device 100 performance and battery levels by executing background operations while the electronic device 100 battery is being charged. Example process flow 300 can be performed by elements of a memory system 110 (FIG. 1), such as memory controller 111, pulse pattern detector 118, processor 120, etc.

At operation 302, the memory system 110 receives (e.g., from a host device 105 over, e.g., interface 116) a pulse signal at a pin (e.g., reset pin 119). As discussed above, in many examples, the pulse signals will be provided through one or more pins and associated paths between the host and memory system that are used for other command/control signals (in the present example the reset pin for signal RST_n, in the current UFS standard, as identified earlier herein). The host device 105 may be configured to automatically generate the pulse signal, when the host device 105 is receiving power from an external source (as opposed to from the system battery).

At operation 304, the pulse pattern detector 118 of the memory controller 111, coupled to the reset pin 119, determines whether the pulse signal conforms to a first pulse pattern corresponding to a "battery charging" pulse pattern. Predetermined pulse patterns can include not only a "battery charging" pulse pattern, but other indications useful for regulating memory operations, such as second pattern to indicate a low battery state, etc. In some examples, the pulse pattern may indicate a time period during which the memory system 110 is permitted to perform background operations. As described earlier herein, the pulse pattern detector 118 can use filtering circuitry and timing circuitry to aid in detection of pulse parameters (such as amplitude, to filter noise; and timing parameters such as pulse width, rising and falling edges, etc.). Detection of such pulse parameters can help the pulse pattern detector 118 distinguish the received pulse signal from a reset signal, for example, or from another of multiple pulse patterns representative of selected states. At operation 306, the memory controller 111 initiates execution of a memory system 110 background operation responsive to determining that the pulse signal conforms to a first pulse pattern. In examples, the first pulse pattern can indicate "battery charging."

If the pulse signal does not conform to the first pulse pattern (or any other predetermined pulse pattern), the pulse signal may be a standard reset signal or other signal. In such cases, the example process flow 300 can include performing a reset or waiting for a next pulse signal, among other possible operations.

Figure 4:
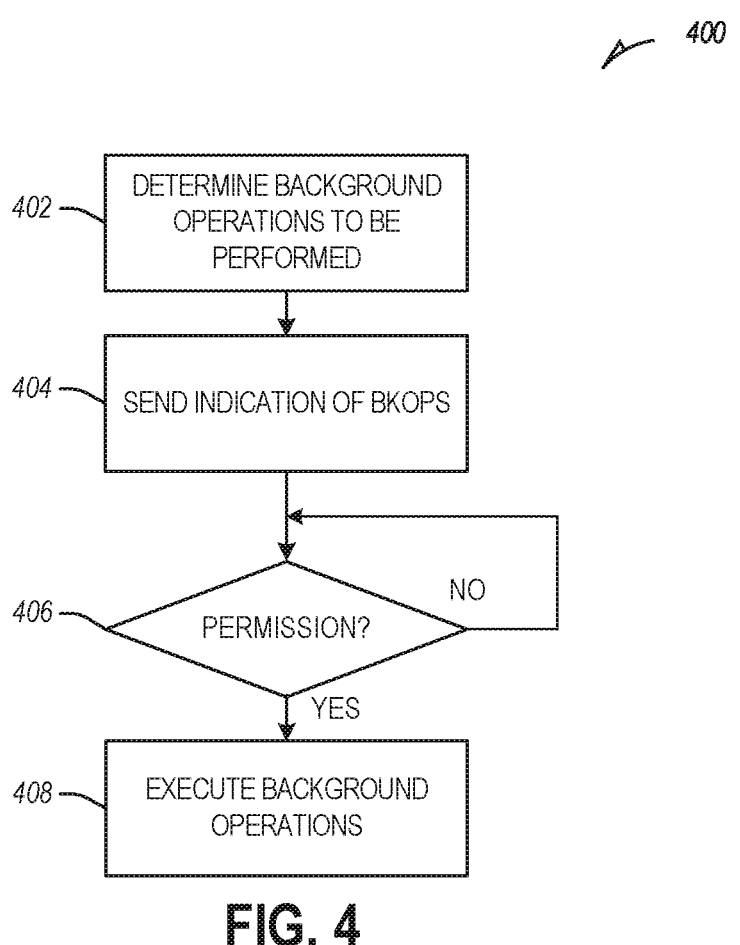
FIG. 4 is a flowchart showing another example of a process flow for performing memory system background operations.

In some examples, the memory system 110 executes background operations upon receiving permission data 122 from the host device 105 via the interface 115. For example, the permission data 122 can take the form of a command, message, or other UFS-compliant communication. FIG. 4 is a flowchart showing one example of a process flow 400 that may be executed by a memory system, such as the memory system 110, to perform background operations. The process flow 400 may be based, for example, on a permission message received by the memory system 110 from the host device 105.

At operation 402, the memory system 110 determines background operations to be performed. The background operations may include, for example, GC operation, SLC cache management, cell refresh operations, updating a tracking database, and so on. For example, the memory controller 111 may track the state of the various memory devices 112 at the memory system 110 to determine when various background operations are needed. For example, the memory controller 111 may determine that GC operations are to be performed when the percentage of stale data at a page exceeds a threshold and/or when the percentage of pages including stale data exceeds a threshold. The memory controller 111 may determine that SLC cache management is to be performed, for example, if the SLC cache of the memory system 110 (and/or any memory devices 112 thereof) is filled or nearly filled.

At operation 404, the memory system 110 sends an indication of background operations to be performed to the host device 105, for example, via the interface 115. In some examples, described herein, the indication of the background operations is provided via a device descriptor stored at the memory system 110, such as the Device Health descriptor described in more detail herein. The host device 105 may periodically query the descriptor, as described herein. At operation 406, the memory system 110 waits for permission data 122. For example, the host device 105 can be programmed to provide the permission data 122 at a time when the electronic device 100 is charging its battery and/or when the host device 105 has otherwise determined that it is a suitable for the memory system 110 to perform background operations. If permission data 122 is not received, the memory system 110 may continue to wait. The host device 105 may notice that the memory system 110 has a need or preference to perform background operations, for example, based on the indication provided at operation 404.

If permission data is not received at operation 406, the memory system 110 may continue to wait for permission data. If permission data is received at operation 406, the memory system 110 may execute background operations at operation 408. In some examples, the permission data 122 is received by a flag, such as a UFS flag, that can be set by the host device 105 as described herein. The permission data 122 may also include and/or refer to parameter data describing parameters of the permission granted to the memory system 110 to execute background operations. In some examples, the parameter data includes time data describing a time period during which the memory system 110 is permitted to execute background operations. Accordingly, the memory system 110 may execute background operations during the indicated time period.

Figure 5:
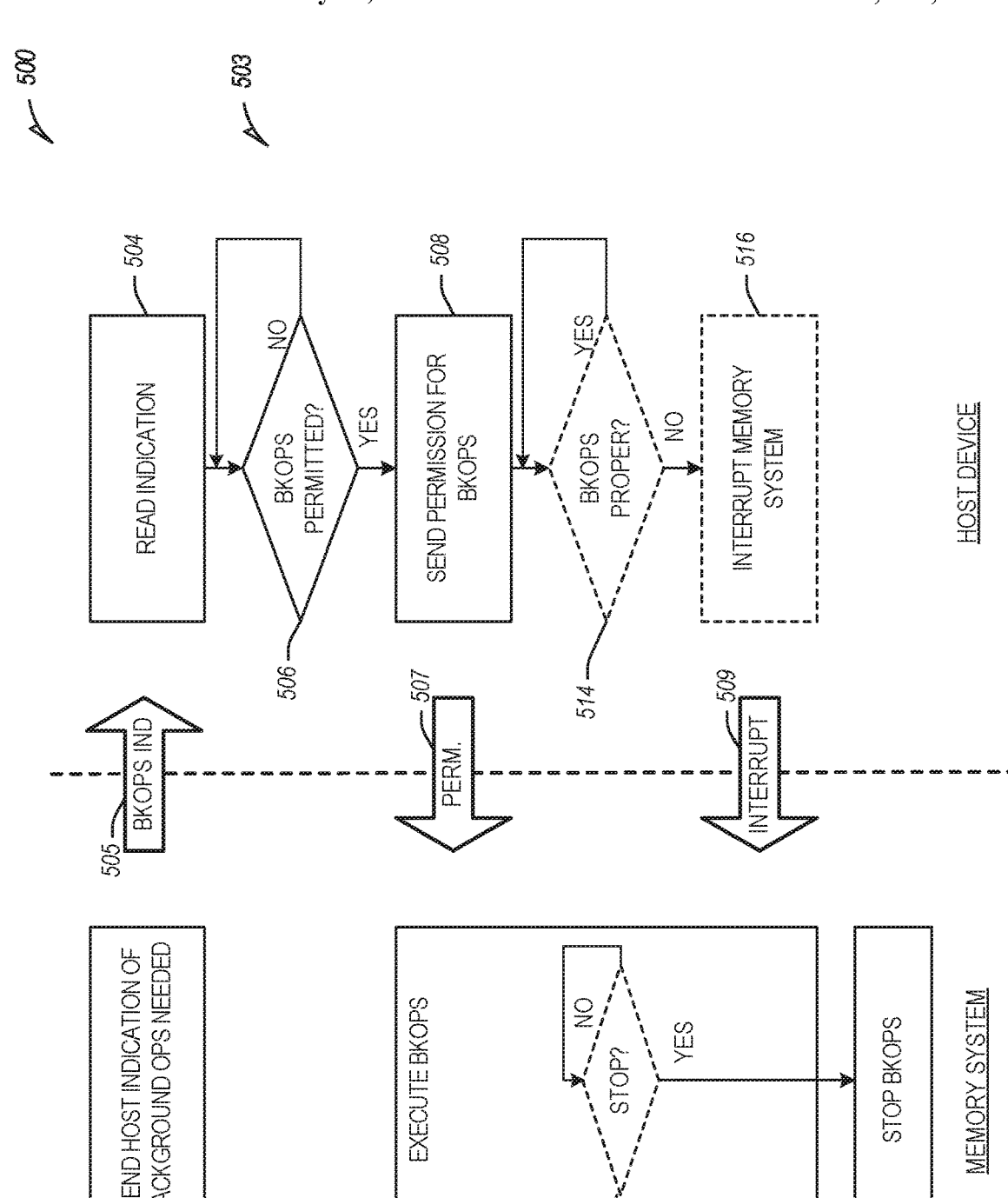
FIG. 5 is a flowchart showing one example of a process flow that may be executed by the host device and the memory system to execute background operations at the memory system.

FIG. 5 is a flowchart showing one example of a process flow 500 that may be executed by the host device 105 and the memory system 110 to execute background operations at the memory system 110. The flowchart of FIG. 5 includes two columns. A first column 501 shows operations that are performed by the memory system 110. A second column 503 shows operations that are performed by the host device 105.

At operation 502, the memory system 110 sends an indication 505 of background operations to be performed to the host device 105, for example, via the interface 115. The host device reads the indication 505 at operation 504. In some examples, described herein, the memory system 110 sends the indication 505 by writing the indication to a Device Health descriptor or other device descriptor, as described herein. The host device 105 may read the indication 505 by querying the appropriate device descriptor.

At operation 506, the host device 105 determines if it is permissible for the memory system 110 to execute background operations. The host device 105 may consider various factors. For example, the host device 105 may utilize the charge detection and signaling circuit 103 to determine whether the electronic device 100 is currently charging its battery, indicating that an external source of power is available. If the electronic device 100 is charging its battery, the host device 105 may determine that it is appropriate for the memory system 110 to execute background operations. In other examples, the host device 105 considers other factors in addition to or instead of whether the battery of the electronic device is charging. For example, the host device 105 may consider whether the electronic device 100 is idle. For example, if the electronic device 100 is charging, but not idle, it may not be desirable for the memory system 110 to execute background operations. Also, in some examples, the electronic device 100 includes more than one memory system, where the host device 105 may be configured to manage the memory system 110 and one or more other memory systems (not shown in FIG. 1). It may not be desirable for more than one memory system to perform background operations at the same time. Accordingly, the host device 105 may manage the time period when the memory system 110 performs background operations to limit the number of memory systems executing background operations at any given time.

If the host device 105, at operation 506, determines that it is not permissible for the memory system 110 to execute background operations, the host device may continue to check, for example, periodically, whether it is permissible for the memory system 110 to execute background operations. If the host device 105 determines that it is permissible for the memory system 110 to execute background operations at operation 506, the host device 105 sends background operation permission data 507 at operation 508. The background operation permission data 507 may be sent via the interface 115. In some examples, the host device 105 sends the permission data 507 by setting a flag stored at a location of the memory system 110. The memory system 110 may determine that the flag has been sent and begin executing background operations at operation 510.

While executing background operations, the memory system 110 may determine, at optional operation 512, whether to stop executing background operations. If the memory system 110 determines not to stop executing background operations, it may continue executing background operations. If the memory system 110 determines to stop executing background operations, it stops executing background operations at operation 518. The memory system 110 may determine that it should stop executing background operations, for example, if the background operations are complete. The memory system 110 may also determine that it should stop executing background operations if a time period for executing the background operations (e.g., provided by the host device 105) has expired.

In some examples, the memory system 110 determines to stop background operations if it receives a stop background operations interrupt signal. For example, the host device 105, at optional operation 514, may continue to determine if background operations are permissible for the memory system 110. For example, the host device 105 may determine whether the battery of the electronic device 100 is still being charged (e.g., whether an external source of power is available). If the battery of the electronic device 100 is no longer being charged, the host device 105 may determine that the memory system 110 should no longer execute background operations and, therefore, generate the stop background operations interrupt signal. In another example, the host device 105 may monitor requests to execute background operations from other memory systems or other devices of the electronic device 100. If another device has requested to execute background operations (or execute any other kind of operation that would make it disadvantageous for the memory system 110 to continue), then the host device

105 may determine that it is no longer permissible for the memory system 110 to continue executing background operations. In another example, the host device 105 may determine that it is no longer permissible for the memory system 110 to execute background operations when a time period for executing the background operations has expired.

If, at operation 514, the host device 105 determines that it is no longer permissible for the memory system 110 to execute background operations, then the host device may trigger a stop background operations interrupt signal 509 at operation 516. The memory system 110 may receive the interrupt signal 509 at operation 512 and proceed to stop executing background operations at operation 518. In some examples, the memory system 110 may also provide background operations stopped data to the host device 105 indicating that the execution of background operations has stopped. For example, the memory system 110 may set a flag indicating that background operations are stopped, where the flag is accessible to the host device 105. In some examples, the flag set by the memory system 110 to indicate that it has stopped executing background operations is the same flag set by the host device 105 to trigger a stop background operation interrupt, as described herein.

Figure 6:
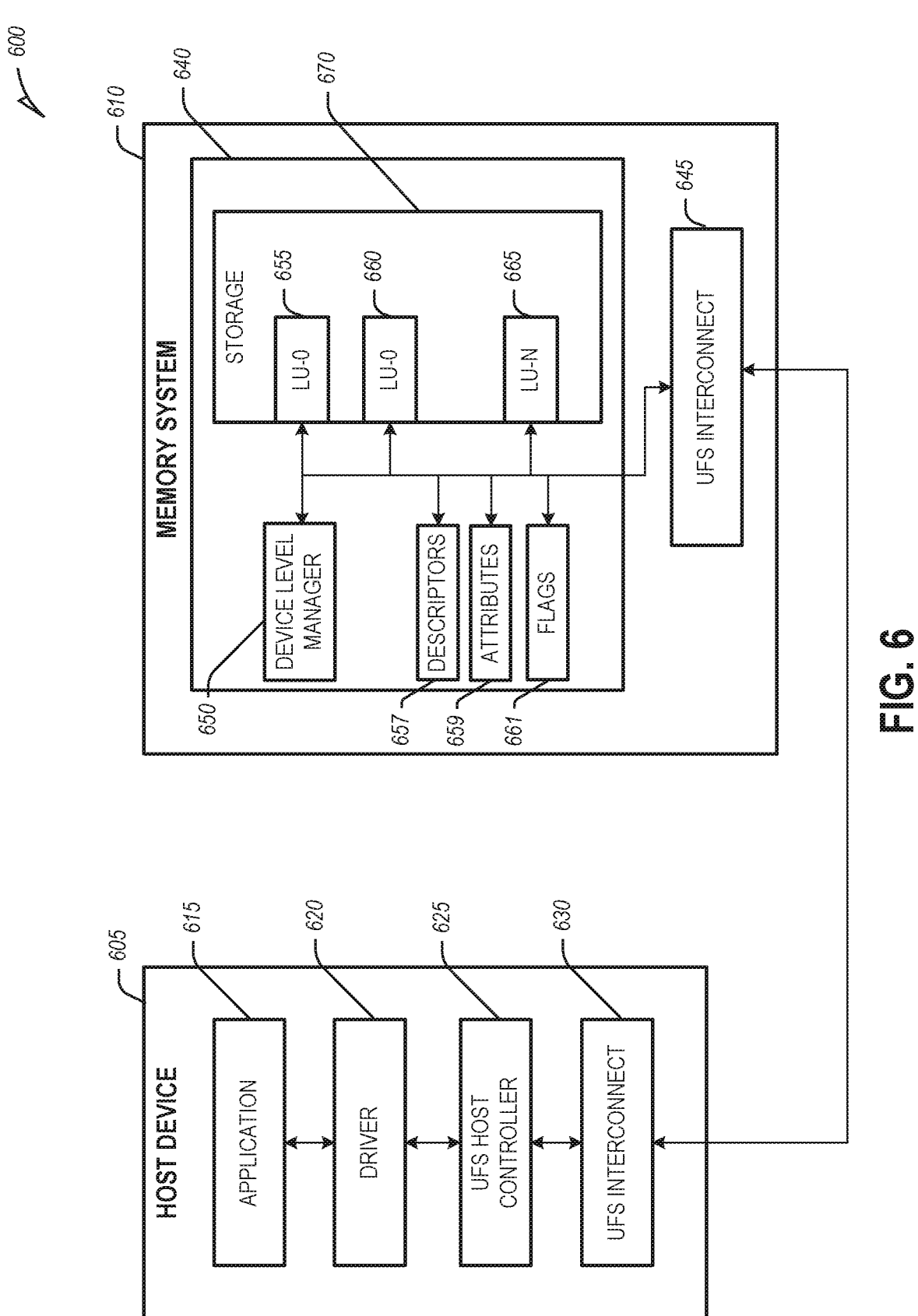
FIG. 6 shows one example of an electronic device including a host device and a memory system, where the memory system includes a Universal Flash Storage (UFS) device.
Figure 10:
FIG. 10 shows an environment including an example electronic device shown as part of one or more apparatuses.
Figure 11:
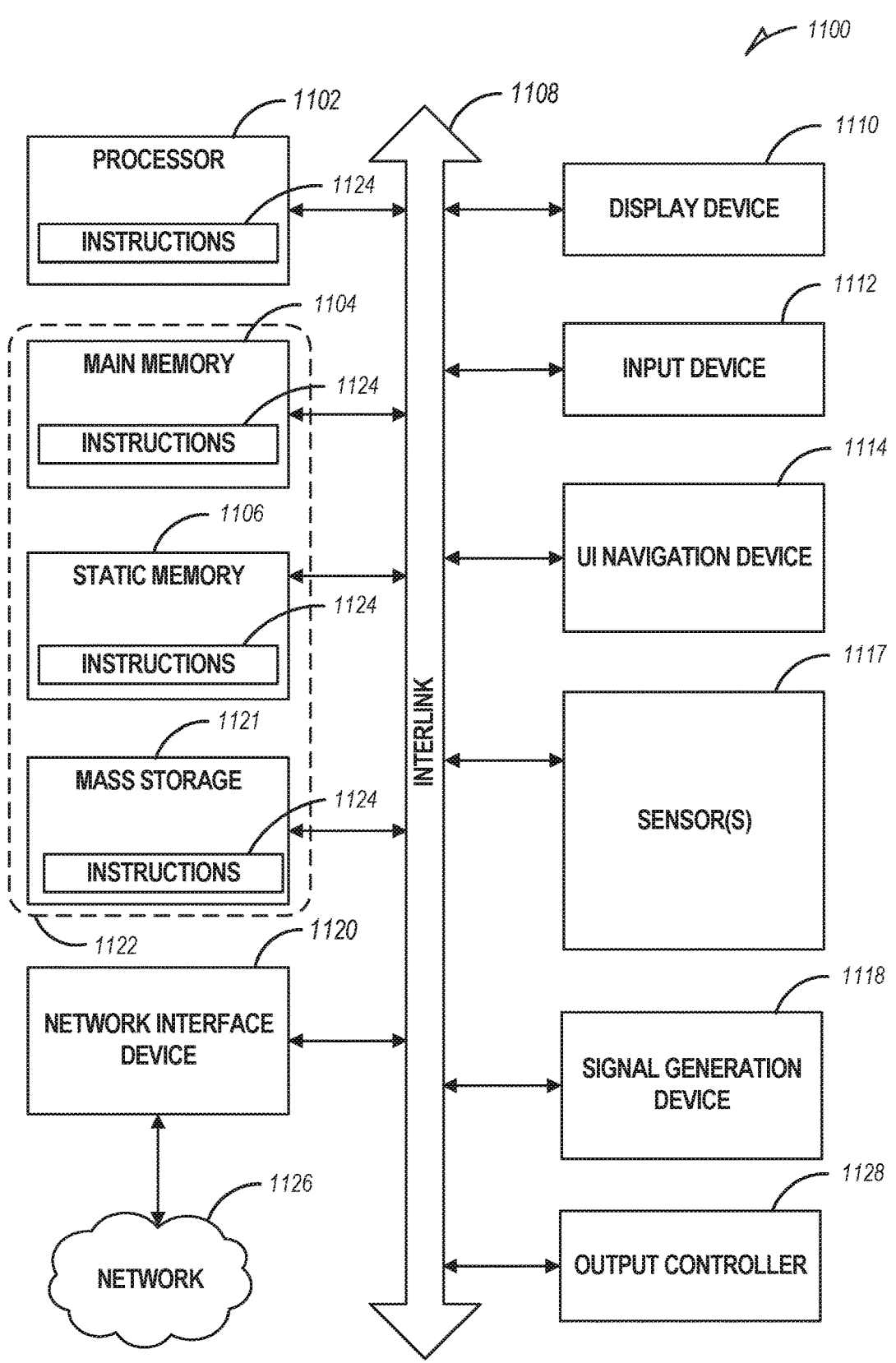
FIG. 11 shows a block diagram of an example machine upon which any one or more of the techniques (e.g., methodologies) discussed herein may perform.

In some examples, an electronic device includes one or more UFS devices and utilizes UFS-compliant communications, or similar communications, to communicate to a memory system including a UFS device that the memory system may execute background operations at the UFS device. For example, the electronic device may utilize attributes, flags, and/or descriptors of UFS or a similar protocol to conduct communications regarding background operations at a memory system. For example, FIG. 6 shows one example of an electronic device 600 including a host device 605 and a memory system 610, where the memory system 610 includes a UFS device 640. The host device 605 is an entity or a device with the characteristics of a computing device (e.g., as shown in FIGS. 10 and 11) that includes one or more Small Computer System Interface (SCSI) initiator devices. In some examples, the host device 605 may be an application processor of the electronic device 600 (e.g., processor 1102 of FIG. 11). Initiator devices (initiators) are devices or processes which initiate a UFS transaction to a target device and are identified by an Initiator ID (IID). For example, different processes (e.g., operating systems) may each have a unique IID, a radio portion of a phone might have a unique IID, and the like. In some examples, the host device 105 of FIG. 1 may be arranged as a host device 605.

The host device 605 may execute one or more applications 615 that read or write data to the UFS device 640. Applications 615 interface with a UFS driver 620 which manages the UFS host controller 625 through a UFS Host Controller Interface using a set of registers. Registers may be volatile memory, non-volatile memory, or any combination and may be a temporary storage location that is used by the UFS host controller 625. The UFS host controller 625 utilizes the UFS interconnect 630 to communicate with the UFS interconnect 645 of the UFS device 640. The UFS device 640 is a target device (e.g., receives UFS commands). The electronic device 600 may include both the host and the UFS device. The UFS interconnect comprises the physical layer and provides basic transfer capabilities to the upper layers. The UFS interconnect 645 communicates with the components of the UFS device 640. In some examples, the host device 605 may be an application specific integrated circuit (ASIC) or one or more other microprocessors designed to act as an interface to the UFS device 640. In some examples, applications 615, driver 620, UFS host controller 625, and UFS interconnect 630 may be implemented in hardware or software (e.g., be implemented as computer-readable instructions that are performed by a hardware processor such as processor 1102 of FIG. 11).

UFS device 640 features a device level manager 650 that provides for device level features such as power management and the like (which may be executed by memory controller 111 of FIG. 1). Storage 670 may be one or more NAND storage cells or storage devices segmented into a plurality of Logical Unit (LU)s 0-N (655, 660, 665) that handle read/write and other storage related commands. For example, a 16 GB UFS device might be configured as 4 LUs of 4 GB each. In some examples, each die on a memory device may be a LUN. Storage 670 may be an example organization of memory cells. In some examples, the device level manager 650, device descriptors 657, attributes 659, flags 661, and UFS interconnect 645 may be implemented by one or more hardware processors.

Device descriptors 657 are one or more memory locations (e.g., blocks or pages) accessible to the host device 605 that include parameters describing something about a device. Device descriptors 657 may be stored at locations of the UFS device 640 that are accessible to queries from the device level manager 650 and/or the host device 605. Flags also describe something about the UFS device 640. Flags 661 comprise one or more bits that can be modified by the host device 605 and/or the UFS device 640 to perform communications between the devices 605, 640. Attributes 659 also describe something about the UFS device 640. For example, attributes 659 may comprise one or more bytes, where each of the one or more bytes corresponds to an attribute of the UFS device 640. Device descriptors 657, attributes 659, and flags 661 may be stored at memory locations outside of logical units 655, 660, 665 at storage 670 as shown in FIG. 6. In some examples, however, device descriptors 657, attributes 659, and/or flags 661 may be stored at storage 670.

Figure 7:
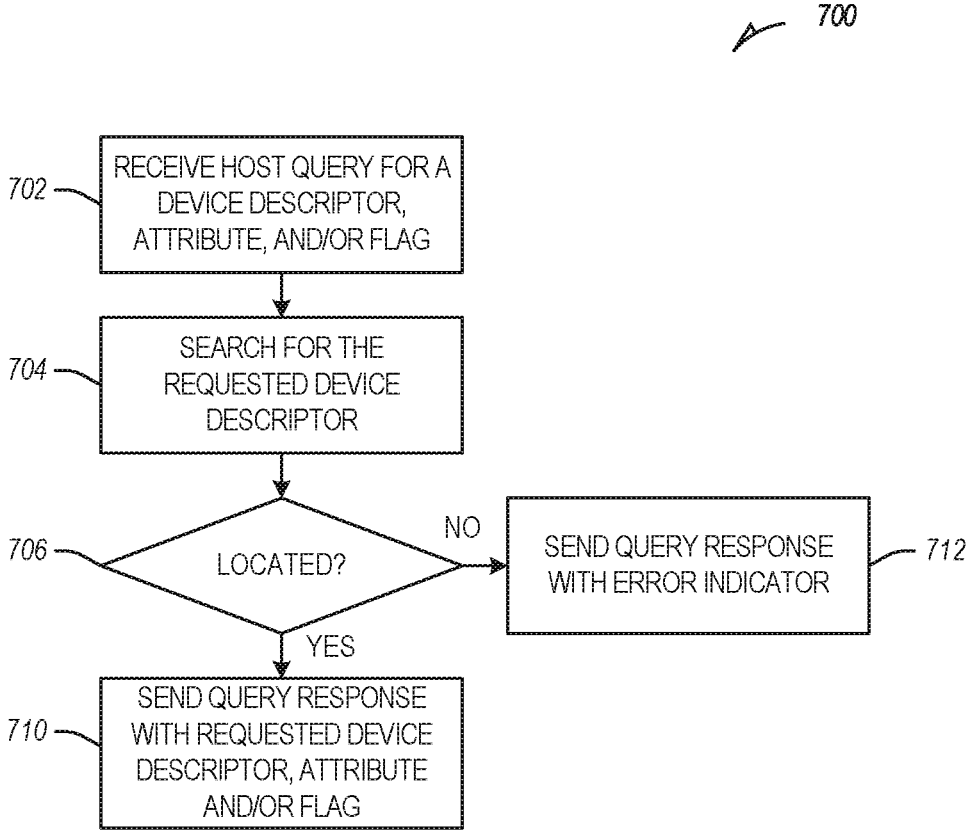
FIG. 7 is a flowchart showing one example of a process flow that may be executed by a memory system to provide a device descriptor, attribute, and/or flag in response to a request.

Device descriptors 657, attributes 559, and flags 661 of a storage device are queried by the host device 605 through a Query Request UFS Protocol Information Unit (UPIU) and corresponding replies are provided through a Query Response UPIU. FIG. 7 is a flowchart showing one example of a process flow 700 that may be executed by a memory system, such as the memory system 610 or the memory system 110, to provide a device descriptor, attribute, and/or flag in response to a request. The process flow 700 applies generally to all requests for device descriptors, attributes, and/or flags, but will be described in reference to the background operations case described herein. At operation 702, the memory device receives a host query for a device descriptor, e.g., through a UPIU request message. In some examples, the message may request a device descriptor including background operation data written by the UFS Device 640, such as the UFS DEVICE_HEALTH descriptor. Accordingly, the host device may read an indication of background operations to be performed by a memory system by querying the DEVICE_HEALTH descriptor. In other examples, the message may be for one or more flags. In this way, the host device 605 may determine whether the memory system 610 has set or cleared any flags indicating that it is performing background operations.

At operation 704, the host device searches for the requested device descriptor, attribute, or flag. If the requested device descriptor, attribute, or flag is found at operation 706, then a query response with the requested device descriptor, attribute, or flag (e.g., the DEVICE_

HEALTH descriptor) is sent at operation 710 (e.g., as part of a Query Response UPIU). If the requested device descriptor, attribute, or flag is not located at operation 704, then at operation 710, a response is sent with an error indicator, such as an error code that is part of the Query Response UPIU).

Figure 8:
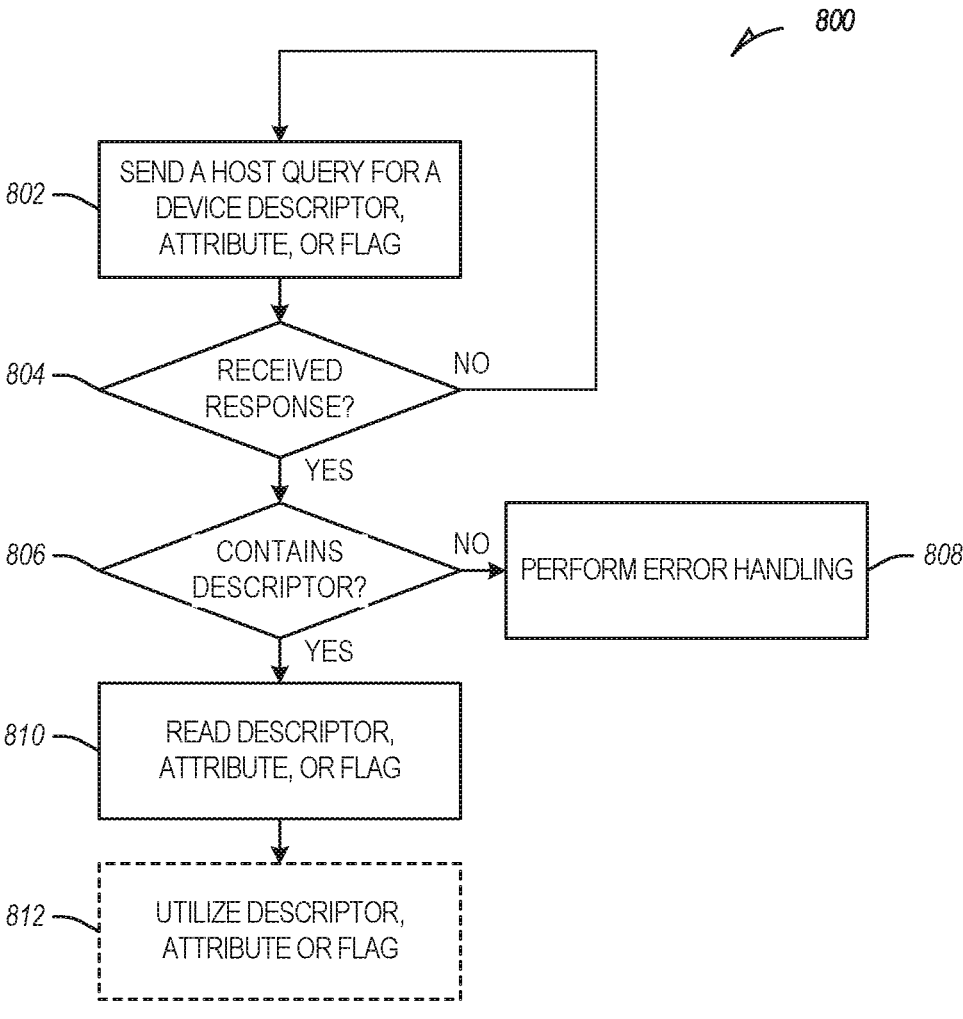
FIG. 8 is a flowchart showing one example of a process flow that may be executed by a host device to read a device descriptor, attribute, and/or flag of a memory device.

Turning now to FIG. 8, a flowchart showing one example of a process flow 800 that may be executed by a host device, such as the host device 605 or the host device 105, to read a device descriptor, attribute, and/or flag of a memory device, such as a memory device of the memory system 610. The process flow 800 applies generally to requests for device descriptors, attributes, and flags but will also be described in reference to the background operations case described herein. At operation 802, the host device 605 sends a host query for values of a device descriptor, attribute, or flag (for example, the DEVICE_HEALTH descriptor, or other descriptor, attribute, and/or flag including data regarding memory system background operations). The host device 605 may set a timer to ensure that a response is received. If the response is not received within a timeout period, at operation 804, the host device 605 may retry to send the message at operation 802. If, at operation 804, a response is received within the timeout period, then at operation 806, the response may be parsed and a determination may be made if the response includes the requested descriptor, attribute, and/or flag. If not, then various error handling procedures may be adopted at operation 808. If the response contains the descriptor, attribute, or flag, then at operation 810, the descriptor, attribute, or flag may be read and/or saved to a memory of the host device 605 (e.g., in a RAM of the host device). Optionally, at operation 812, the host device may utilize the descriptor, attribute, or flag. For example, if the descriptor includes an indication of background operations to be performed at the memory system 610, then the host device 605 may use the indication to determine whether to send the memory system 610 permission to execute background operations and, in some examples, background operation parameters such as, for example, a time period for performing the background operations, temperature conditions under which the background operations may be performed, as described herein.

Figure 9:
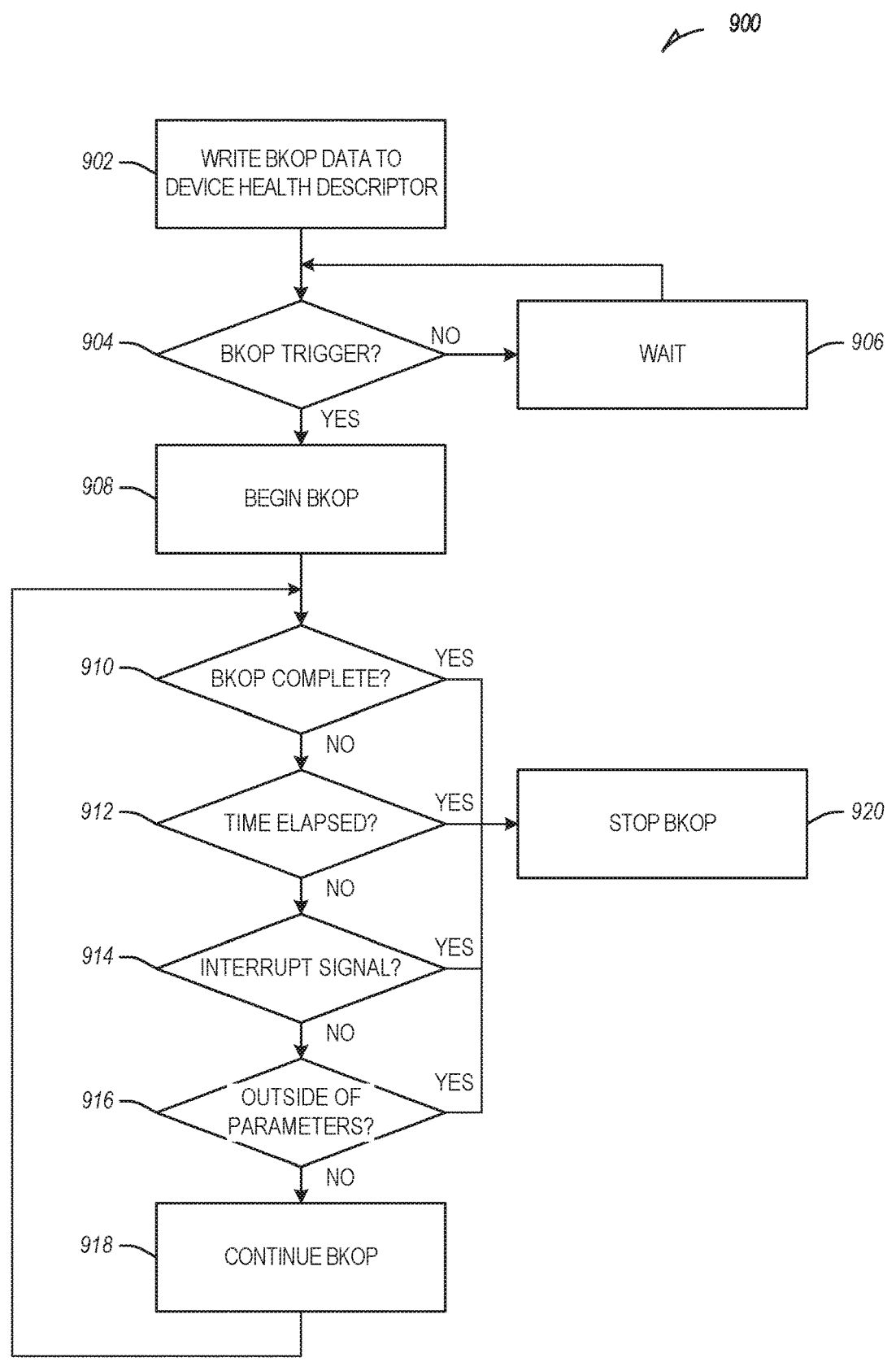
FIG. 9 is a flowchart showing one example of a process flow that may be executed by a memory system to execute background operations utilizing UFS-compliant communications with a host device.

FIG. 9 is a flowchart showing one example of a process flow 900 that may be executed by a memory system, such as the memory system 110 or 610, to execute background operations utilizing UFS-compliant communications with a host device, such as the host device 105 or 605. At operation 902, the memory system writes background operation data to a device descriptor, attribute, and/or flag, such as the UFS DEVICE_HEALTH descriptor. The background operation data provides information about background operations to be executed at the memory system such as, for example, volume data indicating a volume of background operations to be performed at the memory system. The volume of background operations describes the number of, length of, or other measure of the quantity of background operations to be performed. Example units for describing the volume of background operations may describe an amount of memory to be garbage collected, a number of cells to be refreshed, an amount of data to be moved from SLC cache to MLC cells, etc.

In some examples, the device descriptor, such as the DEVICE_HEALTH descriptor, comprises a background operations byte or other set of bits. Example configurations for a background operations byte are shown by TABLE 1 below:

TABLE 1

| Value | Background Operation Volume |
|---|---|
| 00h | No background operations |
| 01h | First level of background operations |
| 02h | Second level of background operations greater than the first level |
| 03h | Third level of background operations greater than the second level |
| 04-FFh | Reserved |

At operation 904, the memory system determines whether a background operations trigger has been set. The background operations trigger may be, for example, a bit at a flag. The host device may set the trigger, for example, to provide permission for the memory system to begin executing background operations. The memory system may periodically poll the relevant descriptor, attribute, or flag containing the operations trigger. If the background operations trigger is not set, the memory system may wait at operation 906 and then determine again, at operation 904, whether the background operations trigger is set. In some examples, the memory system continues to perform non-background operations, such as reads and writes, while waiting for the background operations trigger to be set.

If, at operation 904, the memory system determines that the background operations trigger is set, it begins to execute background operations at operation 908. In some examples, before initiating execution of background operations, the memory system obtains parameter data describing background operation parameters. For example, the host device may write background operation parameters to various device descriptors. In some examples, the host device writes minimum and maximum temperature data describing minimum and maximum temperatures for performing background operations to one or more attributes. Upon detecting the background operations trigger, the memory system may read the appropriate attribute or attributes to determine minimum and/or maximum temperatures for executing background operations. Also, in some examples, the host device writes a time period for executing the operations to a device descriptor, attribute, or flag such as the UFS CONFIG descriptor. For example, the host device may write the time period to one or more predetermined bytes at the CONFIG descriptor. In some examples, two bytes are used and the corresponding time period measured in seconds, such that the memory system may be given between 0 to FFFF FFFFh seconds to complete background operations (e.g., 0-4,294,967,295 seconds). Any other suitable number of bytes, unit of time, or range of time periods may be used, however.

While background operations are executing, the memory system may monitor conditions and stop executing background operations if the monitored conditions so indicate. For example, at operation 910, the memory system may determine if the background operations are complete. If the background operations are complete, the memory system may stop background operations at operation 920. At operation 912, the memory system may determine whether the time period for executing the background operations has elapsed. If the time period has elapsed, the memory system stops executing background operations at operation 920.

At operation 914, the memory system determines whether the host device has set a stop background operations interrupt signal. For example, the host device may send the stop background operations interrupt signal by setting a flag (e.g., a UFS flag such as at flags 661). The memory system may periodically poll to determine whether the stop background operations interrupt is set. In another example, the flag, when set by the host device, may automatically trigger a hardware interrupt at the memory system. Upon detecting the stop background operations interrupt signal, the memory system may stop background operations at operation 920. At operation 916, the memory system may determine if it is operating outside any background operation parameters, such as, for example, a minimum or maximum temperature. If the memory system is outside of any background operation parameters, it may stop background operations at operation 920.

If none of the conditions tested at operations 910, 912, 914, 916 are present, then the memory system may continue to execute background operations at operation 918. The memory system may continue to periodically test the conditions of operations 910, 912, 914, 916 while background operations are performed. While various portions of the disclosure herein may be described with respect to UFS, one of ordinary skill in the art with the benefit of the present disclosure will recognize that the disclosed improvements may also be applied to eMMC and other interfaces between a storage device and a host.

FIG. 10 shows an environment 1000 including an example electronic device 1001 having a host device 1010 and a memory system 1020 (e.g., memory system 110) as part of one or more apparatuses 1030-1050. Apparatuses include any device that may include an electronic device, such as electronic device 1001. The electronic device 1001 may be any device capable of executing instructions (sequential or otherwise). Example apparatuses include a vehicle 1030 (e.g., as part of an infotainment system, a control system, or the like), a drone 1050 (e.g., as part of a control system), furniture or appliances 1040 (e.g., as part of a sensor system, an entertainment or infotainment system), or the like. In other examples, although not shown, apparatuses may include aeronautical, marine, Internet of Things (IOT), and other devices.

FIG. 11 shows a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, an IoT device, automotive system, or any other electronic device capable of executing instructions (sequential or otherwise) that specify actions to be taken by that electronic device. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a non-transitory computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1100 (e.g., host device 105, the memory system 110, memory devices 112, etc.) may include a hardware processor 1102 (e.g., a CPU, a graphics processing unit (GPU), a hardware processor core, or any combination thereof, such as the memory controller 111, 114, etc.), a main memory 1104, and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1122, a signal generation device 1118 (e.g., a speaker), a network interface device 1120, and one or more sensors 1117, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1122 may include one or more machine readable media on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1122 may constitute the machine readable medium.

The term "machine readable medium" may include a single medium or multiple media (e.g., a centralized or distributed database, or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., EPROM, EEPROM) and flash memory devices; magnetic disks, such as internal hard disks and removable disks; magneto-optical disks; and CD-ROM and DVD-ROM disks.

The instructions 1124 (e.g., software, programs, an operating system (OS), etc.) or other data are stored on the storage device 1121 and can be accessed by the memory 1104 for use by the processor 1102. The memory 1104 (e.g., DRAM) is typically fast, but volatile, and thus a different type of storage than the storage device 1121 (e.g., an SSD), which is suitable for long-term storage, including while in an "off" condition. The instructions 1124 or data in use by a user or the machine 1100 are typically loaded in the memory 1104 for use by the processor 1102. When the memory 1104 is full, virtual space from the storage device 1121 can be allocated to supplement the memory 1104; however, because the storage 1121 device is typically slower than the memory 1104, and write speeds are typically at least twice as slow as read speeds, use of virtual memory can greatly reduce user experience due to storage device latency (in contrast to the memory 1104, e.g., DRAM). Further, use of the storage device 1121 for virtual memory can greatly reduce the usable lifespan of the storage device 1121.

In contrast to virtual memory, virtual memory compression (e.g., the Linux kernel feature "ZRAM") uses part of the memory as compressed block storage to avoid paging to the storage device 1121. Paging takes place in the compressed block until it is necessary to write such data to the storage device 1121. Virtual memory compression increases the usable size of memory 1104, while reducing wear on the storage device 1121.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. UFS devices, including controllers and firmware, communicate with a host device using a low-voltage differential signaling (LVDS) serial interface with dedicated read/write paths, further advancing greater read/write speeds.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate but may instead be generally perpendicular to the surface of the substrate and may form an acute angle with the surface of the substrate (e.g., between 60 and 120 degrees, etc.).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to," or "coupled with" another element, it can be directly on, connected, or coupled with the other element or intervening elements may be present. In contrast, when an element is referred to as being "directly on," "directly connected to," or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, RAMs, ROMs, SSDs, UFS devices, eMMC devices, and the like.

In order to further describe the current subject matter, a non-exhaustive set of numbered examples is provided.

Example 1 is an electronic device, comprising: a memory system comprising a memory controller and a plurality of memory locations, the memory controller being programmed to perform operations comprising: communicating, to a host device, a first message describing background operations to be performed at the memory system; receiving, from the host device, a second message indicating permission to execute the background operations; and initiating execution of at least one background operation.

In Example 2, the subject matter of Example 1 optionally includes wherein the first message comprises volume data describing a volume of background operations to be performed at the memory system.

In Example 3, the subject matter of any one or more of Examples 1-2 optionally includes wherein communicating the first message comprises writing background operations data to a memory location of the plurality of memory locations that is accessible to the host device.

In Example 4, the subject matter of any one or more of Examples 1-3 optionally includes wherein the second message indicates a time period when the memory system is to execute the at least one background operation.

In Example 5, the subject matter of any one or more of Examples 1-4 optionally includes the operations further comprising: reading time data from a descriptor memory location, the time data describing a time period when the memory system is to execute the at least one background operation, the descriptor memory location being a memory location of the plurality of memory locations that is accessible to the host device; determining that the time period when the memory system is to execute the at least one background operation has expired prior to completing the at least one background operation; and stopping execution of the at least one background operation.

In Example 6, the subject matter of any one or more of Examples 1-5 optionally includes the operations further comprising: receiving a stop background operations interrupt signal from the host device; and responsive to the stop background operations interrupt signal, stopping execution of the at least one background operation.

In Example 7, the subject matter of any one or more of Examples 1-6 optionally includes the operations further comprising: accessing maximum temperature data describing a maximum temperature of the memory system at which the memory system is to execute the at least one background operation; determining that the memory system has exceeded the maximum temperature; and stopping execution of the at least one background operation.

In Example 8, the subject matter of any one or more of Examples 1-7 optionally includes the operations further comprising, after completing the at least one background operation, writing background operations stopped data to a descriptor memory location, the background operations stopped data indicating that the at least one background operation is complete, the descriptor memory location being a memory location of the plurality of memory locations that is accessible to the host device.

Example 9 is a method for executing background operations at a memory system comprising a memory controller and a plurality of memory locations, the method comprising: communicating, by the memory system, to a host device, a first message describing background operations to be performed at the memory system; receiving, by the memory system, from the host device, a second message indicating permission to execute the background operations; and initiating execution of, by the memory system, at least one background operation.

In Example 10, the subject matter of Example 9 optionally includes wherein the first message comprises volume data describing a volume of background operations to be performed at the memory system.

In Example 11, the subject matter of any one or more of Examples 9-10 optionally includes wherein communicating the first message comprises writing background operations data to a memory location of the plurality of memory locations that is accessible to the host device.

In Example 12, the subject matter of any one or more of Examples 9-11 optionally includes wherein the second message indicates a time period when the memory system is to execute the at least one background operation.

In Example 13, the subject matter of any one or more of Examples 9-12 optionally includes reading, by the memory system, time data from a descriptor memory location, the time data describing a time period when the memory system is to execute the at least one background operation, the descriptor memory location being a memory location of the plurality of memory locations that is accessible to the host device; determining, by the memory system and prior to completing the at least one background operation, that the time period when the memory system is to execute the at least one background operation has expired; and stopping, by the memory system, the at least one background operation.

In Example 14, the subject matter of any one or more of Examples 9-13 optionally includes receiving, by the memory system, a stop background operations interrupt signal from the host device; and responsive to the stop background operations interrupt signal, stopping execution of the at least one background operation.

In Example 15, the subject matter of any one or more of Examples 9-14 optionally includes accessing, by the memory system, maximum temperature data describing a maximum temperature of the memory system at which the memory system is to execute the at least one background operation; determining that the memory system has exceeded the maximum temperature; and stopping execution of the at least one background operation.

In Example 16, the subject matter of any one or more of Examples 9-15 optionally includes after completing the at least one background operation, writing background operations stopped data to a descriptor memory location, the background operations stopped data indicating that the at least one background operation is complete, the descriptor memory location being a memory location of the plurality of memory locations that is accessible to the host device.

Example 17 is a non-transitory computer-readable medium comprising instructions thereon that, when executed by at least one processor, causes the at least one processor to perform operations comprising: communicating, by a memory system, to a host device, a first message describing background operations to be performed at the memory system, the memory system comprising a memory controller and a plurality of memory locations; receiving, by the memory system, from the host device, a second message indicating permission to execute the background operations; and initiating execution of, by the memory system, at least one background operation.

In Example 18, the subject matter of Example 17 optionally includes wherein the first message comprises volume data describing a volume of background operations to be performed at the memory system.

In Example 19, the subject matter of any one or more of Examples 17-18 optionally includes wherein communicating the first message comprises writing background operations data to a memory location of the plurality of memory locations that is accessible to the host device.

In Example 20, the subject matter of any one or more of Examples 17-19 optionally includes wherein the second message indicates a time period when the memory system is to execute the at least one background operation.

The above description is intended to be illustrative, and not exhaustive or restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An electronic device, comprising:
a memory system comprising a memory controller and a plurality of memory locations, the memory controller being programmed to perform operations comprising:
communicating, to a host device, a first message describing at least one background operation to be performed at the memory system;
receiving, from the host device, a second message indicating permission to execute the at least one background operation described by the first message to the host device, the second message being responsive to the first message;
initiating execution of the at least one background operation;
while executing the at least one background operation, receiving an indication from the host device that the memory system is to stop execution of the at least one background operation; and
responsive to the indication that that the memory system is to stop execution of the at least one background operation, stopping execution of the at least one background operation.

2. The electronic device of claim 1, wherein the first message comprises volume data describing a volume of background operations to be performed at the memory system.

3. The electronic device of claim 1, wherein communicating the first message comprises writing background operations data to a memory location of the plurality of memory locations that is accessible to the host device.

4. The electronic device of claim 1, wherein the second message indicates a time period when the memory system is to execute the at least one background operation.

5. The electronic device of claim 1, the indication that the memory system is to stop execution of the at least one background operation comprising a stop background operation interrupt signal received from the host device.

6. The electronic device of claim 1, the indication that the memory system is to stop execution of the at least one background operation comprising an indication that a temperature of the memory system has exceeded a maximum temperature.

7. The electronic device of claim 1, the operations further comprising, reading time data from a descriptor memory location, the time data describing a time period when the memory system is to execute the at least one background operation, the descriptor memory location being a memory location of the plurality of memory locations that is accessible to the host device the indication that the memory system is to stop execution of the at least one background operation comprising an indication that the time period when the memory system is to execute the at least one background operation has expired prior to completing the at least one background operation.

8. The electronic device of claim 1, the operations further comprising, after completing the at least one background operation, writing background operations stopped data to a descriptor memory location, the background operations stopped data indicating that at least one background operation is complete, the descriptor memory location being a memory location of the plurality of memory locations that is accessible to the host device.

9. A method for executing background operations at a memory system comprising a plurality of memory locations, the method comprising:
communicating, by the memory system and to a host device, a first message describing at least one background operation to be performed at the memory system;
receiving, by the memory system and from the host device, a second message indicating permission to execute the at least one background operation described by the first message to the host device, the second message being responsive to the first message;
initiating, by the memory system, execution of the at least one background operation;
while executing the at least one background operation, receiving, by the memory system, an indication from the host device that the memory system is to stop execution of the at least one background operation; and
responsive to the indication that the memory system is to stop execution of the at least one background operation, stopping, by the memory system, execution of the at least one background operation.

10. The method of claim 9, wherein the first message comprises volume data describing a volume of background operations to be performed at the memory system.

11. The method of claim 9, wherein communicating the first message comprises writing background operations data to a memory location of the plurality of memory locations that is accessible to the host device.

12. The method of claim 9, wherein the second message indicates a time period when the memory system is to execute the at least one background operation.

13. The method of claim 9, the indication that the memory system is to stop execution of the at least one background operation comprising a stop background operation interrupt signal received from the host device.

14. The method of claim 9, the indication that the memory system is to stop execution of the at least one background operation comprising an indication that a temperature of the memory system has exceeded a maximum temperature.

15. The method of claim 9, further comprising, reading, by the memory system, time data from a descriptor memory location, the time data describing a time period when the memory system is to execute the at least one background operation, the descriptor memory location being a memory location of the plurality of memory locations that is accessible to the host device the indication that the memory system is to stop execution of the at least one background operation comprising an indication that the time period when the memory system is to execute the at least one background operation has expired prior to completing the at least one background operation.

16. The method of claim 9, further comprising, after completing the at least one background operation, writing, by the memory system, background operations stopped data to a descriptor memory location, the background operations stopped data indicating that at least one background operation is complete, the descriptor memory location being a memory location of the plurality of memory locations that is accessible to the host device.

17. A non-transitory computer-readable medium comprising instructions thereon that, when executed by at least one processor of a memory system, causes the at least one processor to perform operations comprising:

communicating, to a host device, a first message describing at least one background operation to be performed at the memory system, the memory system comprising a plurality of memory locations;

receiving, from the host device, a second message indicating permission to execute the at least one background operation described by the first message to the host device, the second message being responsive to the first message;

initiating execution of the at least one background operation;

while executing the at least one background operation, receiving accessing an indication from the host device that the memory system is to stop execution of the at least one background operation; and responsive to the indication that the memory system is to stop execution of the at least one background operation, stopping execution of the at least one background operation.

18. The non-transitory computer-readable medium of claim 17, wherein the first message comprises volume data describing a volume of background operations to be performed at the memory system.

19. The non-transitory computer-readable medium of claim 17, wherein communicating the first message comprises writing background operations data to a memory location of the plurality of memory locations that is accessible to the host device.

20. The non-transitory computer-readable medium of claim 17, wherein the second message indicates a time period when the memory system is to execute the at least one background operation.

* * * * *